(12) United States Patent  (10) Patent No.: US 7,936,377 B2
Friedhoff et al.  (45) Date of Patent: May 3, 2011

(54) METHOD AND SYSTEM FOR OPTIMIZING AN IMAGE FOR IMPROVED ANALYSIS OF MATERIAL AND ILLUMINATION IMAGE FEATURES

(75) Inventors: Richard Mark Friedhoff, New York, NY (US); Casey Arthur Smith, Ithaca, NY (US); Steven Joseph Bushell, Cranston, RI (US)

(73) Assignee: Tandent Vision Science, Inc., San Francisco, CA (US)

( * ) Notice: Subject to any disclaimer, the term of this patent is extended or adjusted under 35 U.S.C. 154(b) by 727 days.

(21) Appl. No.: 11/799,095

(22) Filed: Apr. 30, 2007

(65) Prior Publication Data

US 2008/0266430 A1  Oct. 30, 2008

(51) Int. Cl.
*H04N 5/228*  (2006.01)
(52) U.S. Cl. ............... 348/222.1; 348/268; 348/272; 348/273; 348/274

(58) Field of Classification Search .......... 348/268, 348/272–274, 372–376
See application file for complete search history.

(56) References Cited

U.S. PATENT DOCUMENTS

| 6,142,629 | A  | * | 11/2000 | Adel et al. ............... 351/206 |
| 2004/0135881 | A1 | * | 7/2004 | Jones et al. ............... 348/33 |
| 2006/0004778 | A1 |   | 1/2006 | Lamkin et al. ............ 707/10 |
| 2006/0054782 | A1 |   | 3/2006 | Olsen et al. .............. 707/10 |
| 2007/0102622 | A1 | * | 5/2007 | Olsen et al. ............ 250/208.1 |

* cited by examiner

*Primary Examiner* — Yogesh K Aggarwal

(74) *Attorney, Agent, or Firm* — Davidson, Davidson & Kappel, LLC; Felix L. D'Arienzo, Jr.

(57) ABSTRACT

In a first exemplary embodiment of the present invention, a camera is provided. The camera comprises a lens and a sensor to record an image focused by the lens in N color bands, wherein N equals a number of color bands, with the number and respective locations and widths of the N color bands being selected to optimize the image for processing.

7 Claims, 6 Drawing Sheets

Computer System 10

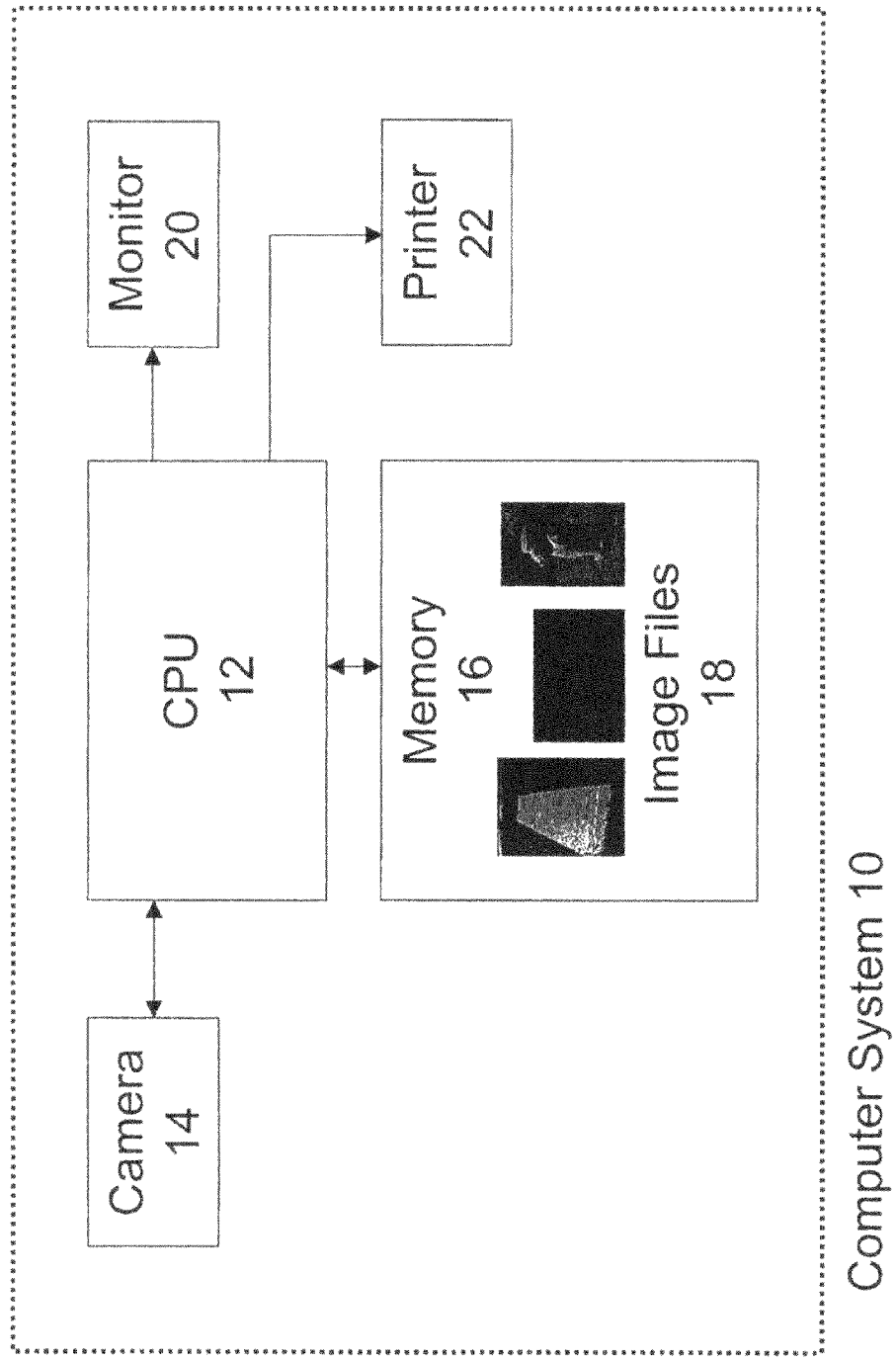
Figure 1: Computer System Configured to Operate on Images

| P(1, 1) | P(1, 2) | ... | P(1, M) | ... | |
|---|---|---|---|---|---|
| P(2, 1) | P(2, 2) | | | | |
| P(3, 1) | P(3, 2) | | | | |
| ... | | | | | |
| P(N, 1) | ... | | | ... | P(N, M) |

Figure 2: Pixel Array for Storing Image Data

Image File 18

METHOD AND SYSTEM FOR OPTIMIZING AN IMAGE FOR IMPROVED ANALYSIS OF MATERIAL AND ILLUMINATION IMAGE FEATURES

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object edge within an image has been a persistent challenge to scientists. Edge detection is a fundamental task in image processing because without accurate and correct detection of the edges of physical objects, no other processing of the image is possible. If a cast shadow is indistinguishable from the object casting the shadow, it would not be possible for the computer to recognize the object.

Typically, commercially available digital cameras record images in a series of pixels. Each pixel comprises digital values corresponding to a set of color bands, for example, most commonly, red, green and blue color components (RGB) of the picture element. While the RGB representation of a scene recorded in an image is acceptable for viewing the image in an aesthetically pleasing color depiction, the red, green and blue bands, with typical commercially acceptable dynamic ranges, may not be optimal for computer processing of the recorded image.

For example, a situation in an image may occur wherein a particular material under a first illumination flux is indistinguishable from a different material under a second, different illumination flux. In such a situation, two pixels of the image, each corresponding to a different material, have nearly identical color values. If a first, lit bluish material depicted in an image has an RGB value of (25, 30, 35) and a second white material in a shadow at the time the image was recorded, also has an RGB value of (25, 30, 35), then the two materials are indistinguishable. If the white material was in a fully lit condition, it would have an RGB value of (250, 250, 250). The presence of indistinguishable color values in an image can confuse results of an image analysis, to, for example, segregate illumination from material color.

When two materials under different illumination conditions are indistinguishable in terms of, for example, RGB color values, calculations concerning the presence of a shadow can result in false positive or false negative findings. Thus, it would be beneficial to provide a method to optimize an image so as to minimize the possibility of phenomena such as indistinguishable color values among different materials, during computer processing of an image.

SUMMARY OF THE INVENTION

The present invention provides a method and system for optimization of the image for improved analysis of material and illumination aspects of an image.

In a first exemplary embodiment of the present invention, a camera is provided. The camera comprises a lens and a sensor to record an image focused by the lens in N color bands, wherein N equals a number of color bands, with the number and respective locations and widths of the N color bands being selected to optimize the image for processing.

In a second exemplary embodiment of the present invention, a method is provided for optimizing a camera design. The method includes the steps of selecting as a function of experimentation, N color bands, wherein N equals a number of color bands, with the number and respective locations and widths of the N color bands being selected to optimize an image for processing and providing a camera sensor arranged and configured to record images in the N color bands. The experimentation can include the steps of preselecting material spectra, and varying band number, band location and bandwidth to determine optimum conditions of a preselected criteria.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programed to carry out the steps of the methods of the present invention.

BRIEF DESCRIPTION OF THE DRAWINGS

FIG. 1 is a block diagram of a computer system arranged and configured to perform operations related to images.

FIG. 2 shows an n X m pixel array image file for an image stored in the computer system of FIG. 1.

DETAILED DESCRIPTION OF THE PREFERRED EMBODIMENTS

Figure 3:
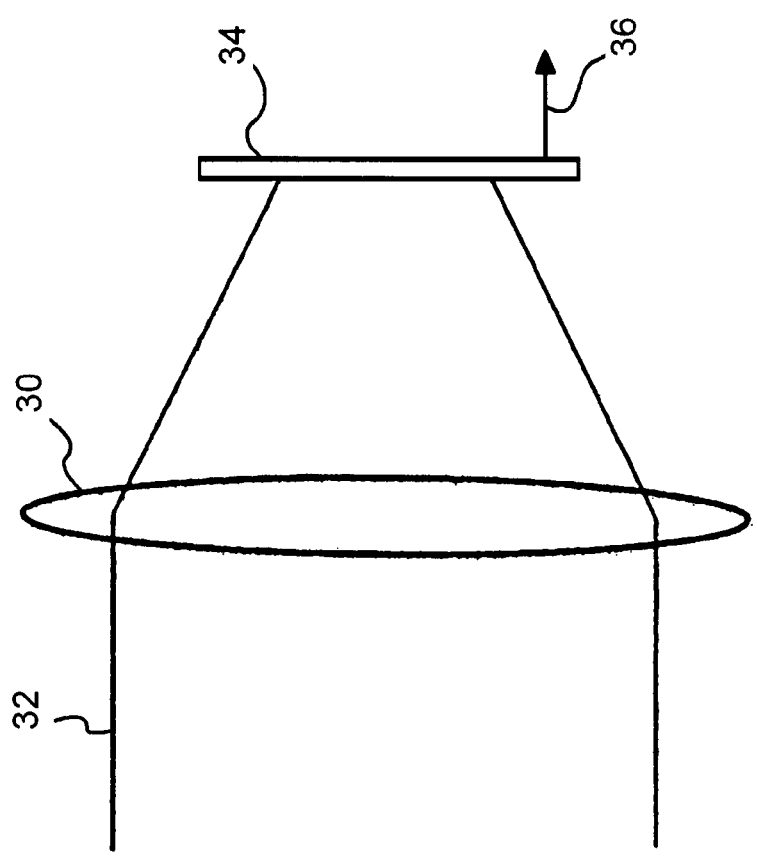
FIG. 3 is a simplified schematic representation of a lens/sensor arrangement for a hyperspectral digital camera.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n X m pixel array. Each pixel, p, is a picture element corresponding to a discrete portion of the overall image. All of the pixels together define the image represented by the image file 18. Each pixel comprises a digital value corresponding to a set of color bands, for example, in a typical commercially available digital camera, red, green and blue color components (RGB) of the picture element. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the color band values of the pixels of a stored image file 18 to achieve various objectives, such as, for example, shadow detection in the subject image. A fundamental observation underlying a basic discovery of the present invention, is that an image comprises two components, material and illumination. All spectral variations in pixel values are caused by one or the other or both of these components. A method for detecting of one of these components, for example, illumination, provides a mechanism for distinguishing material or object variation, such as object edges, from shadows or other variations in illumination. The illumination flux comprises an ambient illuminant and an incident illuminant. The incident illuminant is light that causes a shadow and is found outside a shadow perimeter. The ambient illuminant is light present on both the bright and dark sides of a shadow, but is more perceptible within the dark region.

Pursuant to the present invention, the color band values to be recorded by the camera 14 are determined in a manner to optimize the recorded image of an image file 18, such that the recorded image provides an optimal result in a computer based image process, to, for example, optimize an operation to segregate illumination and material in an image. In an exemplary embodiment of the present invention, the camera 14 comprises a hyperspectral digital camera such as Surface Optics model SOC700-V camera (see www.surfaceoptics.com ). The hyperspectral camera 14 records an image in 120 color bands spaced from approximately 419 nm to approximately 925 nm. The 120 recorded bands can be used to simulate any subset of the 120 bands, for example, 3, 4 or 5 bands of the 120 total bands can be examined. Different bandwidths can be synthesized by taking weighted averages of several bands, for example (band 30*0.2+band 31*0.6+band 32*0.2).

As shown in FIG. 3, a simplified schematic representation of a lens/sensor arrangement for the camera 14 comprises a lens 30 that focuses a beam of light 32 onto a sensor 34. As known in the art, the sensor 34 responds to the beam of light 32 by generating an electrical signal at each of a plurality of surface sections, the electrical signal being a function of the light intensity impinging on the respective section. The various electrical signals are output by the sensor 34 at line 36, for input to a device such as, for example, the computer 12 which digitizes the electrical values, and stores the digitized values as the pixels of an image file 18. As noted above, in conventional commercial cameras, the digitized value for each pixel comprise three numbers corresponding to red, green and blue components of the impinging light (RGB), corresponding to broad bands of light centered at, for example, 475 nm, 535 nm and 625 nm. In the camera 14, the digitized values correspond to 120 color bands.

A series of sets of color band values from among the bands recorded by the hyperspectral camera 14, is selected as a function of a number of bands, and the locations and bandwidths of the selected number of bands, within the electromagnetic spectrum. Moreover, a metric, θ, is established to quantify an undesirable condition with respect to images recorded as a function of the selected sets of band values, such as, for example, a same appearance for recorded images of two different materials.

Pursuant to a feature of the present invention, the general concept of a metamer is applied to computer image analysis. A metamer is defined, in conventional terms of, for example, visual physiology, as a first material with a different material spectrum than a second material, yet which has the same appearance as the second material under certain specific lighting conditions. For example, the tri-stimulus values (typically the RGB values) under certain illumination conditions are the same for the two materials. In the context of computer processing of an image, the present invention defines a same appearance condition as a spectral mimic, that is, two different materials which exhibit different material spectra, where the first material is receiving an illumination flux that is different in either spectral or intensity characteristics from the illumination flux received by the second material, yet the imaged values for certain color bands used to record the image, are indistinguishable between the two materials within the noise levels of the measuring equipment. Thus, the concept of a spectral mimic, an occurrence of the same measured color values among different materials, is used to evaluate conditions for an optimal computer processing of images. The reduction of a number of occurrences of spectral mimics improves the accuracy of analysis to thereby optimize a computer operation to separate illumination and material components of an image.

Sets of color bands are determined in a manner to minimize occurrences of spectral mimics and can be set with reference to specific computer applications for specific sets of materials (such as, for example, materials relevant to forests, houses, roads) for use in specific environments, for example, underwater, outer space, forests and so on and for specific illumination conditions. The metric θ is used to establish criteria for evaluating the image optimization in terms of color values within and without the metric value θ, from among the bands of each of the series of selected sets, as will be described in detail.

Pursuant to a feature of the present invention, determination of an optimal set of color bands is performed via an experimental procedure wherein a montage of images of samples of material spectra is used to provide a range of illumination for each sample material within the montage, from incident to ambient. A series of observations of a quantity of spectral mimics is made in respect of a number of sets of recorded images generated from the montage, each set of recorded images comprising selected numbers of bands and being evaluated in respect of different locations of bands, different numbers of bands and different widths of the bands. In this manner, a minimum number of spectral mimics can be correlated to optimal band location, number and width, and further correlated to different environments and illumination conditions.

In an exemplary embodiment of the experimental procedure of the present invention, the Munsell Book of Color, Matte Edition (hereinafter Munsell Matte) was used to generate the montage. Each color patch of the Munsell book was photographed in sunlight and shadow using the hyperspectral camera 14. Thus, each recorded color patch had a corresponding lit image and a corresponding shadowed image. Moreover, each image was recorded with an intensity in each of the 120 color bands recorded by the hyperspectral camera 14, spaced from approximately 419 nm to approximately 925 nm. An investigation found that the bands above band 83 were noisy. Accordingly, band groups 83-88, 89-96, 97-106 and 107-119 were each merged into a set of 4 corresponding merged bands, one merged band for each band group, for a new total of 87 bands. The remaining 87 bands were capable of linear response to linear inputs, with low noise, so as to be suitable for experimental use.

In a subsequent step of the exemplary experimental procedure, a 2×2 set of four pixels was selected from each recorded lit image and from each corresponding shadowed image of the photographed Munsell color patches. Accordingly, each lit 2×2 pixel set was matched with a 2×2 pixel set from the shadowed image corresponding to the lit pixel set. The 2×2 lit/shadow pairs of pixel sets were then used to generate, for each pair, 19 additional 2×2 pixel sets from weighted averages of the lit and shadowed pixel sets, to span the color values for each lit/shadow pair, in steps, from fully lit to fully shadowed. The Munsell Matte contains 1301 color patches, thus the lit/shadow pixel set pairs with the corresponding 19 additional pixel sets to step from fully lit to fully shadowed versions of each Munsell color patch, provide 27,321 pixel sets.

Thus, an experimental procedure for all 1301 color patches of the Munsell Matte would require excessive resources and time to complete. A procedure can be implemented to reduce the sample count well below 1301, while maintaining a diversity of color spectra sufficient to provide reliable results. Many colors among the 1301 color patches of the Munsell Matte are very similar to one another and within the standard deviation of recorded values for the colors due to noise inherent in the camera 14. Accordingly, the number of samples used to conduct an experiment can be reduced by discarding very similar colors.

An exemplary procedure is to set a threshold distance between pixel values, such that any pixel from one color patch of the Munsell Matte that has a distance that is greater than another pixel from another color patch, by an amount that is in excess of the selected threshold distance, will be considered a different color. If it is within the threshold distance, it will be considered the same color. The threshold is set as a function of the level of noise in the image, parameterized by a standard deviation, as will be described. The 1301 color patch samples from the Munsell Matte, in fully lit images, were used to select a random set of 350 color patches, all having pixel values that differ from one another by an amount greater than the threshold distance.

An exemplary selection procedure used is as follows:
1) Select a not yet examined, fully lit color from the material samples, corresponding to a color patch from the material samples, for example, a color patch from the Munsell Matte, at random;
2) Determine whether a color sample from the lit image selected in step 1 is within the threshold distance with a color sample of any previously selected lit image, if yes, discard the selected lit image, if no, add the lit image selected in step 1 to a list of selected samples;
3) Determine whether the total number of samples in the list is equal to a significant subset of the total number of samples in the Munsell Matte, for example, 350, if yes, the procedure is complete, if no, return to step 1, and select another not yet examined, fully lit material sample.

The threshold value can be determined empirically. For example, given four pixels from a sample material, there are six distance measurements that can be taken between spectra of various pairs of the four pixel set. The distance between spectra of different pixel values can be determined using known metrics such as Sum Of K Largest, AverageSquared and Largest Distance metrics. The distribution of color values of pixels representing the same material is well modeled by a Gaussian distribution with a standard deviation determined by the noise in the camera equipment and variations inherent in the material. Scaling the color distance provides a statistically meaningful metric for determining significant differences between pixels. A distance of 0 indicates identical color, whereas a large distance, beyond, for example double the standard deviation, clearly indicates a different color value. Distance measurements between four pixel sets of a same material were measured for each material of a montage. In our example, a list was prepared indicating the largest distances found between pixels from among the four pixel sets for each of the sample materials. The threshold was defined as the $95^{th}$ percentile of the largest distance values of the list. Any two pixels within the $95^{th}$ percentile threshold distance are assumed to be of the same material and two pixels more distant than the threshold distance are assumed to be from different materials.

Accordingly, the exemplary selection procedure provides 350 randomly chosen materials, all of which are distinguishable from each other in terms of color. All the comparisons above were done using the lit version. In the end, the lit version of one may be the same as the shadowed version of another, or the 20% penumbra of one may be the same as the 60% penumbra of another, and so on. The initial objective of the selection process of the exemplary experimental procedure is to select 350 material samples that are different in color from one another in full direct illumination.

Figure 4:
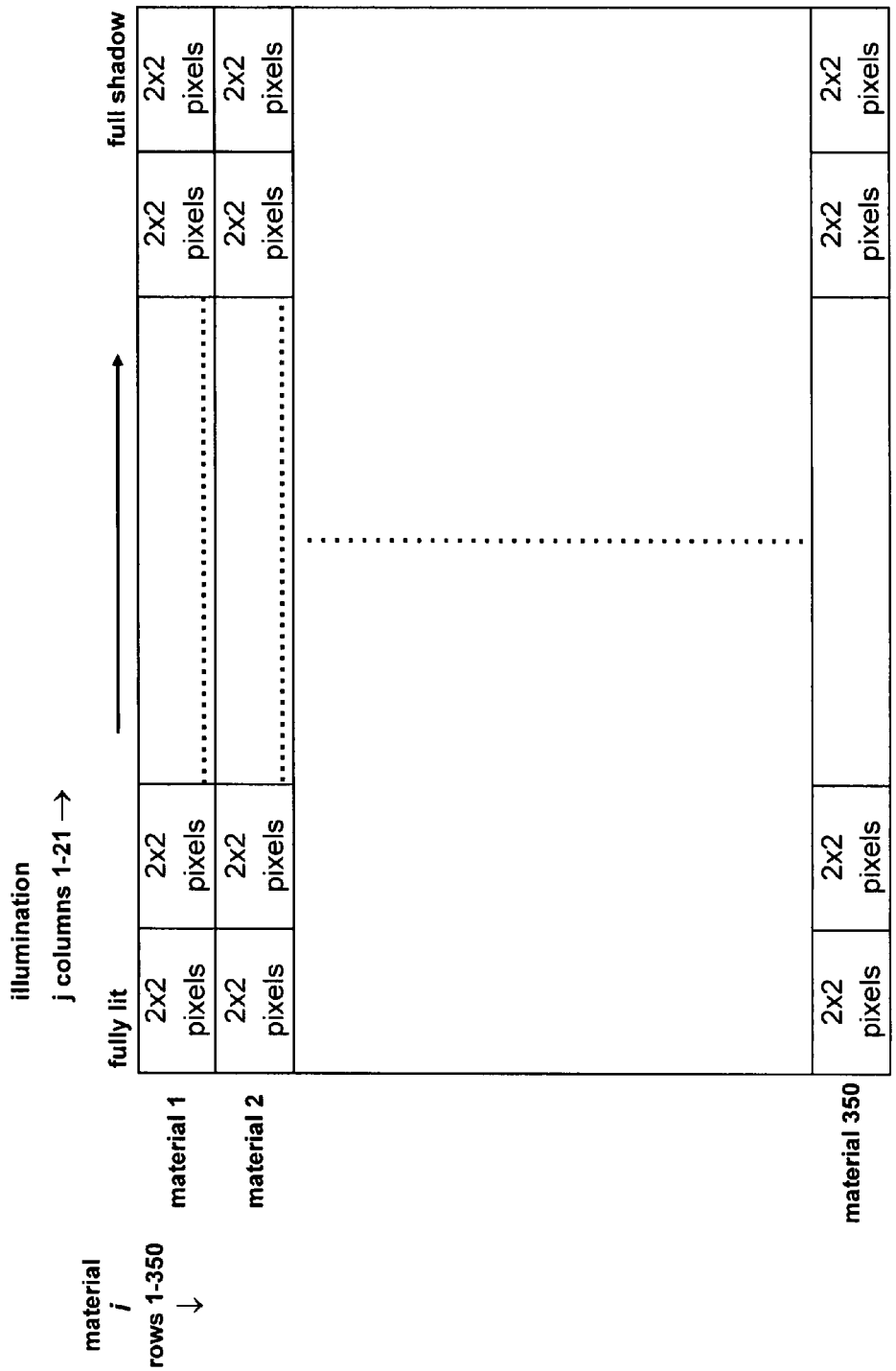
FIG. 4 is a schematic of a material sample montage according to a feature of the present invention.

At this point of the exemplary experimental procedure there are 350 unique color samples, each represented in corresponding images comprising 2×2 pixel sets, each pixel having 87 bands, the 2×2 pixels sets for each material varying in illumination conditions from fully lit to full shadow. To provide the experimental montage, the fully lit to full shadow range of images (21 images including the lit/shadow pair and the 19 generated images), one set for each one of the 350 selected materials, were arranged in rows and columns, as shown in FIG. 4. Each row i represents one material, a series of 21 2×2 pixel sets extending horizontally in the montage, from a fully lit image of the corresponding material to an image in full shadow and each column j corresponds to an illumination condition, from fully lit to full shadow across the material samples.

An evaluation is made to quantify a number of spectral mimics for a particular arrangement of color bands defined by a selected number of bands and the locations and widths of the selected number of bands within the 87 bands. The evaluation is used to determine a selected number of bands having the smallest number of spectral mimics. As noted above, in the exemplary experimental procedure, the evaluation was made with reference to the metric θ. As with the threshold distance used to reduce the sample size from 1301 to 350, the distance value of θ is established as a function of the standard deviation inherent in the camera 14 and spectral distances can be measured using any of the known metrics algorithms, such as, for example the Sum Of K Largest, AverageSquared and Largest Distance metrics. In the evaluation, any color value distances between single pixel values that have a distance value smaller than θ are considered indistinguishable spectra, and comprise a spectral mimic.

A standard deviation is a function of a noise model inherent in the camera 14, which varies with intensity. Given the standard deviations for two spectra, a joint deviation can be stated as the square root of stdDev1*stdDev1+ stdDev2*stdDev2. By way of example, take two 5 band spectra, A=(0.5, 0.6, 0.8, 0.4, 0.3) and B=(0.3, 0.2, 0.7, 0.5, 0.4). Moreover, assume the joint standard deviation between the spectra A and B is determined to be (0.1, 0.1, 0.2, 0.1, 0.2), used as a value for θ. A band distance measure can be established by taking the difference between two band values, square the difference, and divide the square by the square of the joint standard deviation. So, in the case of spectra A and B, for the first band, the distance would be ((0.5−0.3)*(0.5−0.3)/(0.1*0.1)=4. Following a similar calculation for the remaining 4 bands of spectra A and B, we get a set of standard deviation distances of (4, 16, 0.25, 1, 0.25).

In a Sum Of K Largest metric, instead of evaluating each of the 5 standard deviation band distance values, the sum of the k largest values among the 5 distance values is used as a difference measure. Thus, in our example, if k=2, the distance measure would be 16+4=20. If k were 3, the distance measure be 16+4+1=21. In an AverageSquared metric, the sum of all 5 band distances is divided by the number of bands. In our example, (4+16+0.25+1+0.25)/5=4.3. In the Largest metric the largest value is used, in our example, 16.

A count of spectral mimics for each particular evaluated set of bands was implemented via generation of a single pixel value for each 2×2 pixel set of the montage, by averaging the spectra of the four pixels in the respective 2×2 set. In each case, the single pixel value was averaged using those bands from among the 87 bands selected for the particular set of bands. Each single pixel value (as a surrogate for a respective 2×2 pixel set) of the montage was then compared with the single pixel values (based upon the selected bands) corresponding to all the other 2×2 pixel sets in the rows i and columns j of the montage, as shown in FIG. 4.

Evaluations were completed for sets of bands comprising 3-5 bands, each number of bands being evaluated at two different bandwidths, and using each of Sum Of K Largest, AverageSquared and Largest Distance metrics as a measure of pixel distance for determination of and comparison to θ. A count of spectral mimics is expressed by:

$$\Sigma_{i \in pixel\ sets} \Sigma_{j \in pixel\ sets} (1.0 - 1.0/1.0 + e^{-50*(d/\theta - 1.05)}) * ((a)-(b))^2$$

In the above summation equation, j≠i, d is the distance returned by the distance function used to determine a distance between compared single pixel values expressed in terms of the corresponding selected bands from among the 87 recorded bands (for example determined using one of Sum Of K Largest, AverageSquared and Largest Distance), θ is the measure of identity between spectra, as discussed above, a and b are values of from 0.0 to 1.0 each, set as a function of the positions, respectively, of the 2×2 pixel sets (corresponding to the single pixel values being compared), along the length of the respective rows of the montage. Thus, a and b each represent a percentage value of illuminant in the respective single pixel value, from a fully lit condition (1.0) to a full shadow condition (0.0), depending on where the pixel set is located along the horizontal length of the respective row. The fraction and exponent are part of a sigmoid function.

Accordingly, the result provided by the summation equation is that if two spectra of compared single pixel values are different from one another by an amount greater than θ, they do not contribute to the count of spectral mimics. However, if the distance is less than θ, they are considered to be a spectral mimic, and contribute to the count by the factor $((a)-(b))^2$. Thus, if the illumination of the compared pixels is the same, there is no contribution to the count of spectral mimics, but the contribution increases as the illumination differences increase.

A search process was used to select 3, 4 and 5 band sets for evaluation regarding a count of spectral mimics. Moreover, for each number of bands, an evaluation was undertaken for each of relatively thick and relatively thin bandwidths. The relatively narrow bandwidth of each evaluation set can correspond to the narrow bandwidth of the hyperspectral camera 14. A weighted average of several narrow bandwidths from a set of contiguous bands of the hyperspectral camera 14 can be used as the relatively thick bandwidth. Additionally, the pixel distances were measured, for each number of bands, at each bandwidth, using each of SumOf K largest, AverageSquared and Largest Distance metrics. For each number of bands and the selected relatively thick and thin bandwidth versions, it was necessary to determine where to locate the bands within the 87 recorded bands.

According to a feature of the present invention, a local search method was utilized. In a first step of the local search method, a random selection of band locations was selected from among the 87 available band locations, for each of the single pixel values (for each of 3, 4 and 5 band sets). The randomly selected bands can each be centered on any one of the 87 available bands, but should be spaced from one another for distinct color values among the bands. An evaluation was then made to determine a count, according to the summation equation discussed above. After the count of spectral mimics was determined, one of the set of randomly selected bands was then arbitrarily selected and moved to each other available location among the 87 bands, a count of spectral mimics was performed for each location arrangement. After all available locations were evaluated, the band being moved was placed in the location having the lowest count. Then another one of the bands was selected and moved, and so on until a lowest count was obtained for each possible band location for each band of each single pixel value derived from the montage.

Figure 5:
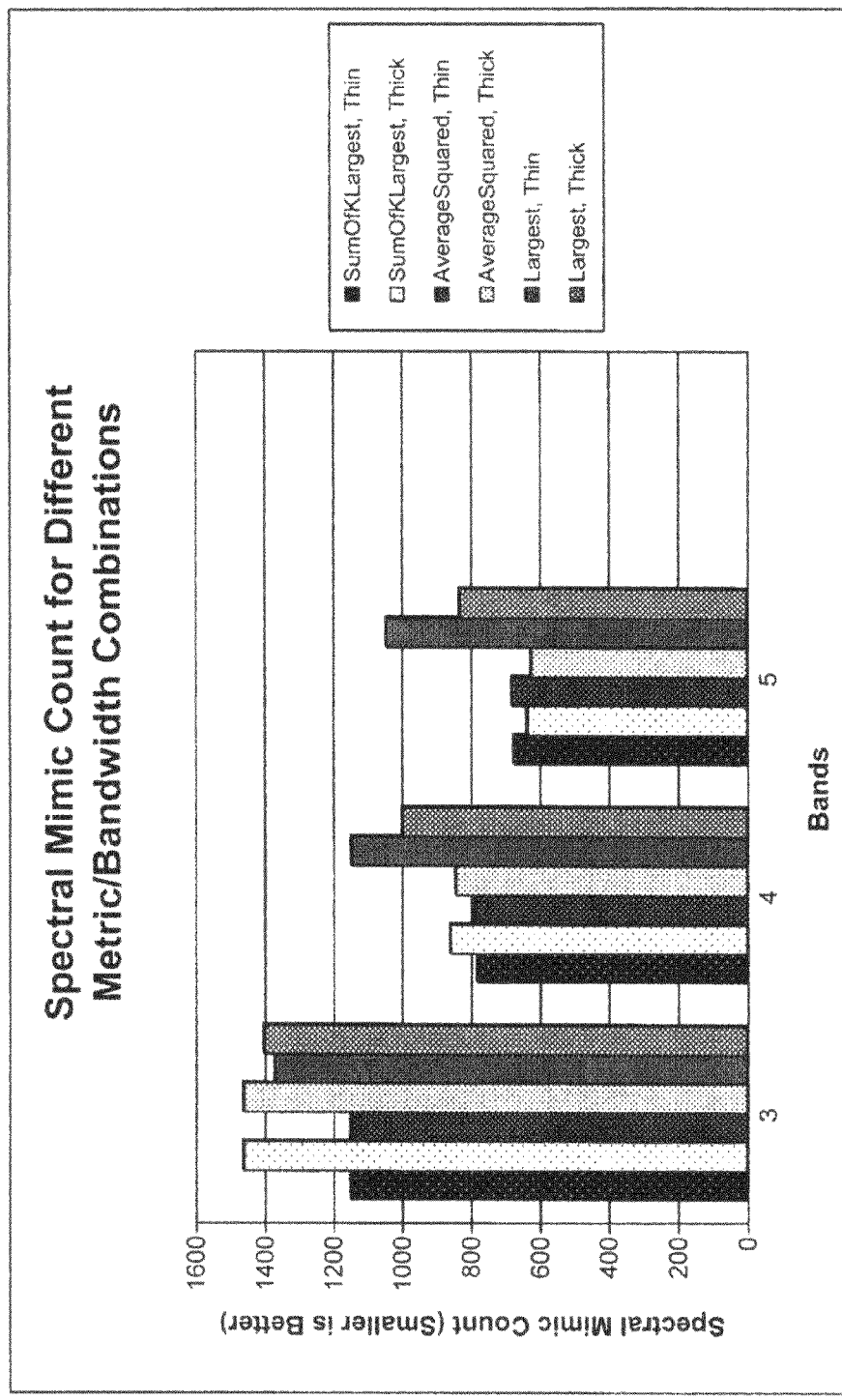
FIG. 5 is a bar graph showing spectral mimic counts from spectral mimic evaluations according to a feature of the present invention.

FIG. 5 is a bar graph showing spectral mimic counts from evaluations obtained using the local search method. As shown, with three bands, the thin bandwidths had lower counts. When using thin bandwidths in the 3 band sets, the Sum Of K Largest and AverageSquared metrics gave the best results. For the 5 band sets, the thicker bandwidths had better results than the thin bandwidths. As with 3 bands, the Sum Of K Largest and AverageSquared metrics gave the best results. The results for 4 and 5 bands were similar relevant to the metric used. The following table summarizes the best results (including an indication of optimal band locations from the local search):

| Bands | Width | Metric | Count | Locations |
| --- | --- | --- | --- | --- |
| 3 | 25 | SumOfKLargest | 1147.08 | 6 30 61 |
| 3 | 25 | AverageSquared | 1147.08 | 6 30 61 |
| 3 | 25 | Largest | 1366.57 | 10 29 59 |
| 3 | 50 | SumOfKLargest | 1457.97 | 0 36 65 |
| 3 | 50 | AverageSquared | 1457.97 | 0 36 65 |
| 3 | 50 | Largest | 1398.33 | 0 30 62 |
| 4 | 18.75 | SumOfKLargest | 778.57 | 10 29 52 67 |
| 4 | 18.75 | AverageSquared | 786.951 | 10 28 52 68 |
| 4 | 18.75 | Largest | 1144.08 | 11 28 45 60 |
| 4 | 37.5 | SumOfKLargest | 856.026 | 0 27 48 68 |
| 4 | 37.5 | AverageSquared | 839.56 | 1 28 48 71 |
| 4 | 37.5 | Largest | 995.469 | 2 28 51 68 |
| 5 | 15 | SumOfKLargest | 672.619 | 9 23 37 53 63 |
| 5 | 15 | AverageSquared | 677.305 | 11 24 37 53 64 |
| 5 | 15 | Largest | 1042.01 | 9 19 32 54 61 |
| 5 | 30 | SumOfKLargest | 633.183 | 8 30 51 69 85 |
| 5 | 30 | AverageSquared | 622.934 | 4 29 49 68 85 |
| 5 | 30 | Largest | 828.373 | 5 21 32 52 67 |

Figure 6:
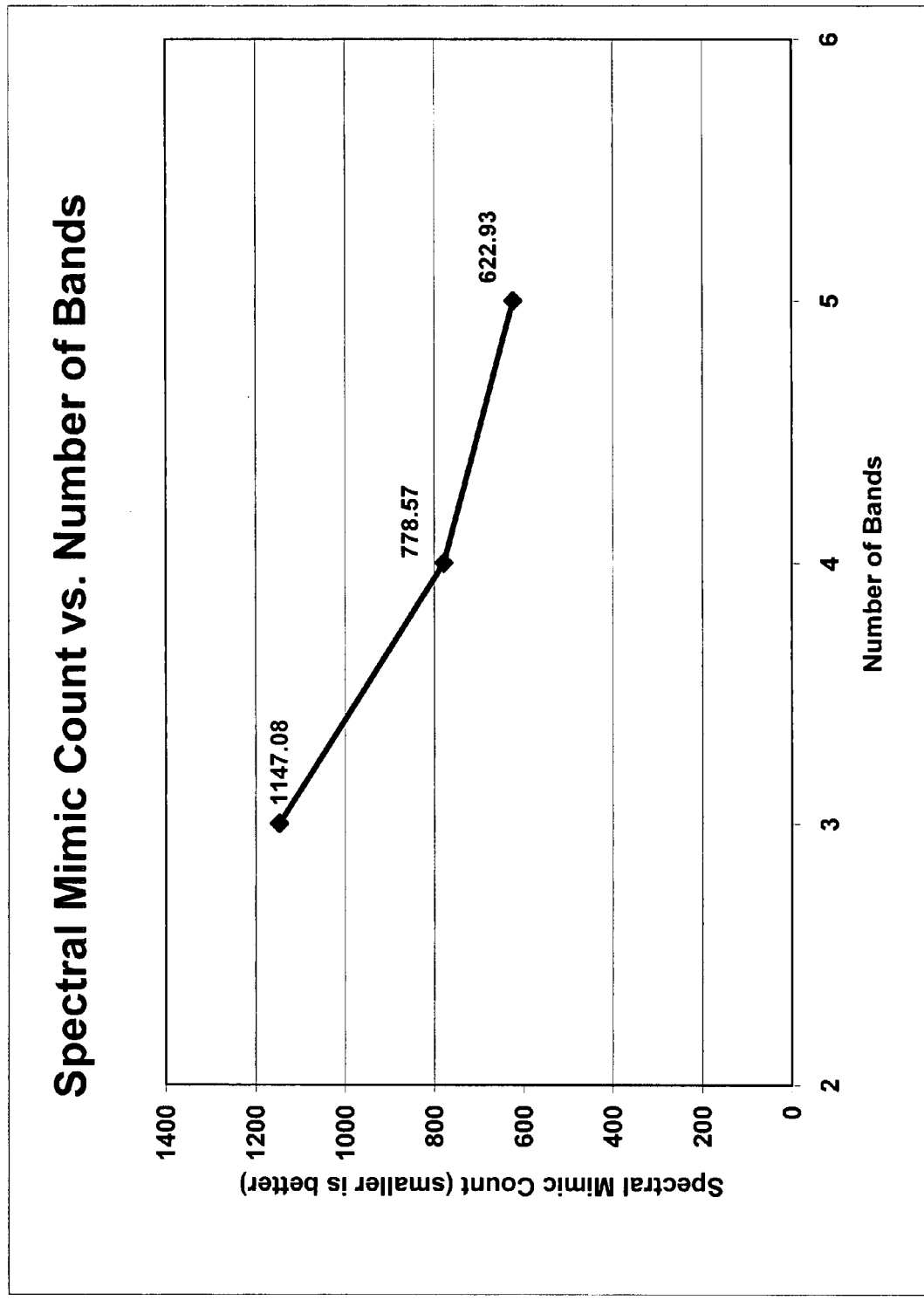
FIG. 6 is a graph showing spectral mimic counts verus number of bands.

As shown in the table, a count of spectral mimics decreases with additional bands. The best results shown in the table (and graphically illustrated in FIG. 5) are plotted in the graph of FIG. 6. Form the graph of FIG. 6 it can be determined that with 4 bands there are only 68% the number of spectral mimics as with 3 bands, and with 5 bands there are only 54% the number of spectral mimics as with 3 bands.

In addition to the local search method, a fixed band approach can be implemented, placing the bands at evenly spaced locations throughout the 87 bands, and varying the number of bands, and bandwidth, without changing the locations of the evenly spaced bands. While this approach does not yield results as good as a search method, the fixed band approach is significantly faster to perform. The present invention contemplates any search method or variations of numbers of bands, locations of bands, bandwidths and distance metrics, to ascertain a band arrangement having a minimum number of spectral mimics among colors and degrees of shadow for a particular material set. The exemplary experimental procedure according to the present invention, as described herein, utilized the Munsell Matte as the material set for the source of material colors, with illumination in sunlight. A best band arrangement will vary for different material sets, illumination conditions and environments, and different material sets, illumination conditions and environments, more representative of actual scenes to be analyzed, could be used as the source of material color samples for evaluation.

When a particular low count band arrangement, including the number of bands, locations of bands and bandwidth, is determined for a selected material set, illumination condition and environment, images are recorded as a function of the determined band arrangement to provide images to the computer 12 most suitable for processing.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A camera comprising a lens and a sensor to record an image focused by the lens, the sensor being configured to record the image in N color bands, wherein N equals a number of color bands, with the number and respective locations and widths of the N color bands being selected as a function of experimentation with preselected material spectra, varying band number, band location and bandwidth to determine optimum conditions of a preselected criteria, to optimize the image for processing of the image for separation of illumination and material components of the image.

2. The camera of claim 1 wherein N is selected to minimize a number of spectral mimics in the image.

3. The camera of claim 1 wherein the preselected criteria comprises a count of spectral mimics.

4. The camera of claim 1 wherein the sensor is a hyperspectral sensor having M bands, and wherein N is a subset of M, selected to optimize the image for processing.

5. A method for optimizing a camera design, comprising the steps of:
selecting as a function of experimentation, N color bands, wherein the experimentation comprises the steps of preselecting material spectra, and varying band number, band location and bandwidth to determine optimum conditions of a preselected criteria such that N equals a number of color bands, with the number and respective locations and widths of the N color bands being selected to optimize an image for processing of the image for separation of illumination and material components of the image;
providing a camera sensor arranged and configured to record images in the N color bands.

6. The method of claim 5 wherein the preselected criteria comprises a count of spectral mimics.

7. The method of claim 5 wherein the step of providing a camera sensor arranged and configured to record images in the N color bands is carried out by providing a hyperspectral sensor having M bands, and wherein N is a subset of M, selected to optimize the image for processing.

* * * * *